US012619431B2

(12) United States Patent
Nusetty et al.

(10) Patent No.: US 12,619,431 B2
(45) Date of Patent: May 5, 2026

(54) ASSESSING NETWORK FEATURES THROUGH SELECTIVE EXECUTION OF SOFTWARE TESTS

(71) Applicant: T-Mobile USA, Inc., Bellevue, WA (US)

(72) Inventors: Madhav Ram Nusetty, Snohomish, WA (US); Bhanu Pant, Bothell, WA (US); Eaian Lorrie Alcanices, Dublin, CA (US); Jay Jitendrabhai Patel, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 426 days.

(21) Appl. No.: 18/463,779

(22) Filed: Sep. 8, 2023

(65) Prior Publication Data

US 2025/0085968 A1 Mar. 13, 2025

(51) Int. Cl.
*G06F 8/77* (2018.01)
*G06F 8/656* (2018.01)

(52) U.S. Cl.
CPC ................ *G06F 8/77* (2013.01); *G06F 8/656* (2018.02)

(58) Field of Classification Search
CPC .................................. G06F 8/77; G06F 8/656
USPC .......................................................... 717/101
See application file for complete search history.

(56) References Cited

U.S. PATENT DOCUMENTS 6,434,364 B1 8/2002 Oriordain
8,024,709 B2 9/2011 Jadhav et al.
8,204,498 B1 6/2012 Koya et al.
8,467,987 B1 6/2013 Davidson et al.
8,554,513 B2 * 10/2013 Kersey ...................... G01F 9/00
702/182

(Continued)

FOREIGN PATENT DOCUMENTS

CN 106415477 A 2/2017
CN 105378680 B 9/2018

(Continued)

OTHER PUBLICATIONS

Tao Zhang, Crowdsourced Testing Services for Mobile Apps, Jun. 8, 2017, IEEE (Year: 2017).*

*Primary Examiner* — Wei Y Mui
*Assistant Examiner* — Amir Soltanzadeh
(74) *Attorney, Agent, or Firm* — Perkins Coie LLP

(57) ABSTRACT

Systems and methods for assessing network features by selectively executing software tests to enhance a customer's experience with a telecommunications service network are disclosed. The method includes accessing, from a database, a suite of test profiles corresponding to software tests for assessing a network feature, wherein each test profile comprises (1) at least a portion of a script, (2) conditions for triggering execution, (3) power consumption availability threshold required for execution, and (4) metrics to be measured. The system may receive, from a device, data indicative of power consumption availability of the device and values corresponding to conditions for triggering execution for the software tests. The system identifies software tests that the device is capable of executing. The system transmits, to the mobile device, at least one portion of a script and receiving an indication of successful execution and metrics indicating network performance of the device during the execution.

20 Claims, 7 Drawing Sheets

(56)                    References Cited

U.S. PATENT DOCUMENTS

| | | | |
|---|---|---|---|
| 8,619,621 | B2 | 12/2013 | Omar |
| 8,856,748 | B1 | 10/2014 | Larsen et al. |
| 9,075,781 | B2 | 7/2015 | Matthews et al. |
| 9,285,857 | B2 | 3/2016 | Mahajan et al. |
| 9,367,436 | B2 | 6/2016 | Matthews et al. |
| 9,524,092 | B2 | 12/2016 | Ren et al. |
| 9,684,787 | B2 | 6/2017 | Sridhara et al. |
| 9,699,649 | B2 | 7/2017 | Shanmugam et al. |
| 9,838,888 | B2 | 12/2017 | Lihosit et al. |
| 9,971,678 | B2 | 5/2018 | Poulin |
| 10,019,729 | B2 | 7/2018 | Kang et al. |
| 10,146,666 | B1 | 12/2018 | Beales et al. |
| 10,353,811 | B2 | 7/2019 | Poulin |
| 10,534,696 | B1 | 1/2020 | Beales et al. |
| 10,691,579 | B2 | 6/2020 | Poulin |
| 10,860,461 | B2 | 12/2020 | Mevorach et al. |
| 10,949,337 | B1 | 3/2021 | Yalla et al. |
| 11,175,908 | B2 | 11/2021 | Mcbride et al. |
| 11,202,212 | B2 | 12/2021 | Karanam |
| 11,297,513 | B2 | 4/2022 | Agarwal et al. |
| 11,314,629 | B2 | 4/2022 | Balakrishnan et al. |
| 11,337,227 | B2 | 5/2022 | Dunsmore et al. |
| 11,455,233 | B2 | 9/2022 | Mevorach et al. |
| 2008/0188216 | A1 | 8/2008 | Kuo et al. |
| 2012/0113813 | A1 | 5/2012 | Haverinen et al. |
| 2014/0095933 | A1* | 4/2014 | Griesinger .......... G06F 11/3688 |
| | | | 714/E11.208 |
| 2015/0019715 | A1* | 1/2015 | Ronen ................... H04W 24/10 |
| | | | 709/224 |
| 2016/0269917 | A1* | 9/2016 | Hillegas, Jr. ......... H04B 17/336 |
| 2017/0068935 | A1 | 3/2017 | Cohen |
| 2019/0188116 | A1 | 6/2019 | Roth |
| 2021/0006993 | A1 | 1/2021 | Chow et al. |
| 2021/0141713 | A1 | 5/2021 | Poulin |
| 2022/0222171 | A1 | 7/2022 | Poulin |
| 2022/0240105 | A1* | 7/2022 | Shaw ................ H04M 1/72403 |
| 2024/0106731 | A1* | 3/2024 | Ramesh ................ H04W 24/06 |

FOREIGN PATENT DOCUMENTS

| | | |
|---|---|---|
| CN | 104077211 B | 11/2018 |
| CN | 111737154 A | 10/2020 |
| CN | 107534879 B | 2/2021 |
| CN | 113760758 A | 12/2021 |
| EP | 1364321 A1 | 11/2003 |
| EP | 1142396 B1 | 10/2008 |
| EP | 2972884 A1 | 1/2016 |
| EP | 3262865 B1 | 4/2020 |
| EP | 3571859 B1 | 3/2022 |
| EP | 3816806 B1 | 7/2023 |
| JP | 2017526944 A | 9/2017 |
| KR | 100603469 B1 | 7/2006 |
| KR | 20170012278 A | 2/2017 |
| WO | 0040049 A1 | 7/2000 |
| WO | 02059803 A1 | 8/2002 |
| WO | 2010083004 A2 | 7/2010 |
| WO | 2014150306 A1 | 9/2014 |
| WO | 2015184185 A1 | 12/2015 |
| WO | 2019180617 A1 | 9/2019 |

* cited by examiner

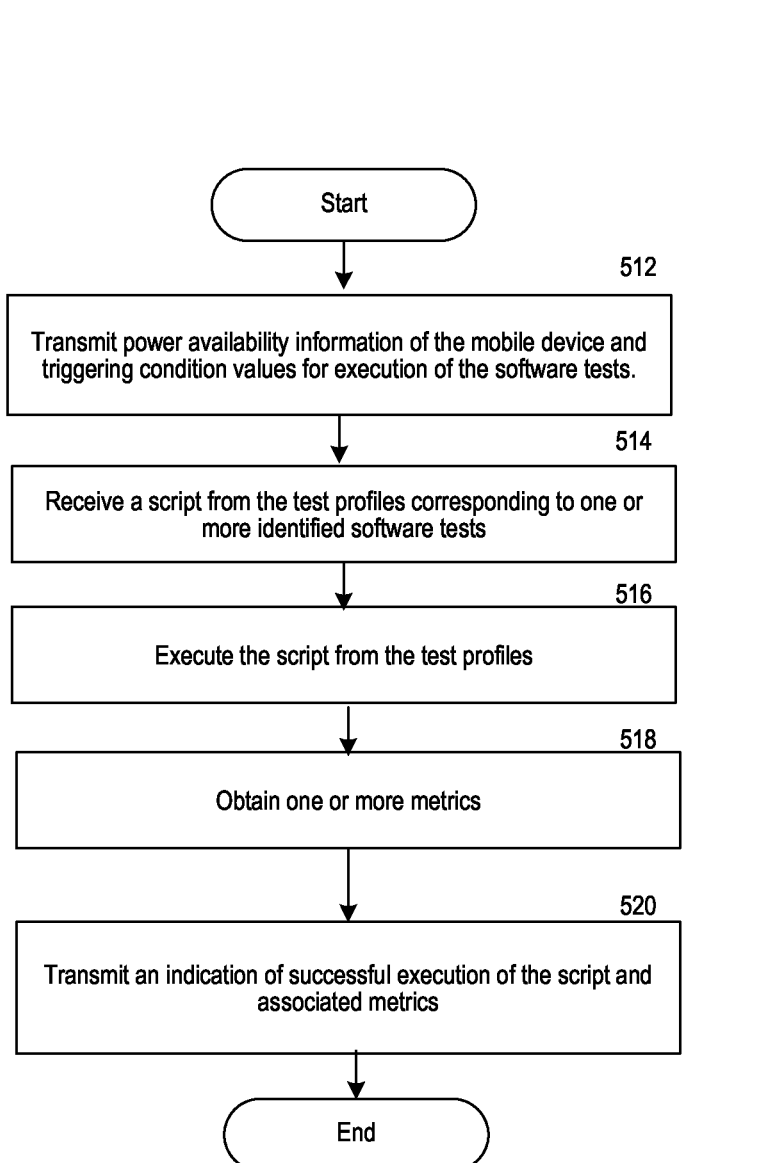

550

Start

512

Transmit power availability information of the mobile device and triggering condition values for execution of the software tests.

514

Receive a script from the test profiles corresponding to one or more identified software tests

516

Execute the script from the test profiles

518

Obtain one or more metrics

520

Transmit an indication of successful execution of the script and associated metrics End

*FIG. 5B*

ASSESSING NETWORK FEATURES THROUGH SELECTIVE EXECUTION OF SOFTWARE TESTS

BACKGROUND

A telecommunications network is established via a complex arrangement and configuration of many cell sites that are deployed across a geographical area. For example, there can be different types of cell sites (e.g., macro cells, micro-cells, and so on) positioned in a specific geographical location, such as a city, neighborhood, and so on). These cell sites strive to provide adequate, reliable coverage for mobile devices (e.g., smart phones, tablets, and so on) via different frequency bands and radio networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Tele-communications System (UMTS), or Long Term Evolution (LTE) network), 5G mobile communications network, IEEE 802.11 (WiFi), or other communications networks. The devices can seek access to the telecommunications network for various services provided by the network, such as services that facilitate the transmission of data over the network and/or provide content to the devices.

As remote device usage continues to rise at an impressive rate, there are often many people using applications requir-ing network connectivity in various urban and remote loca-tions. Software tests are often performed as part of a routine check to ensure that a network functions correctly at differ-ent locations. Before new features are introduced or when they are integrated into a larger software, they are tested via software tests in different regions to ensure proper function. For example, telecommunications networks often use drive testing to measure and assess coverage, capacity, quality of service, and other indicators of network performance for mobile networks. The process may include driving along a designated route using a motor vehicle equipped with net-work measurement equipment to collect data. The collected data is sent to operators who use the information to make decisions for adjustments to the network (e.g., tweaking cell tower configurations, adding new equipment, or planning for the installation of new cell sites).

BRIEF DESCRIPTION OF THE DRAWINGS

Detailed descriptions of implementations of the present invention will be described and explained through the use of the accompanying drawings.

FIG. 5B is a flow diagram illustrating a process of executing software tests and transmitting data to a telecom-munications services testing system.

Figure 1:
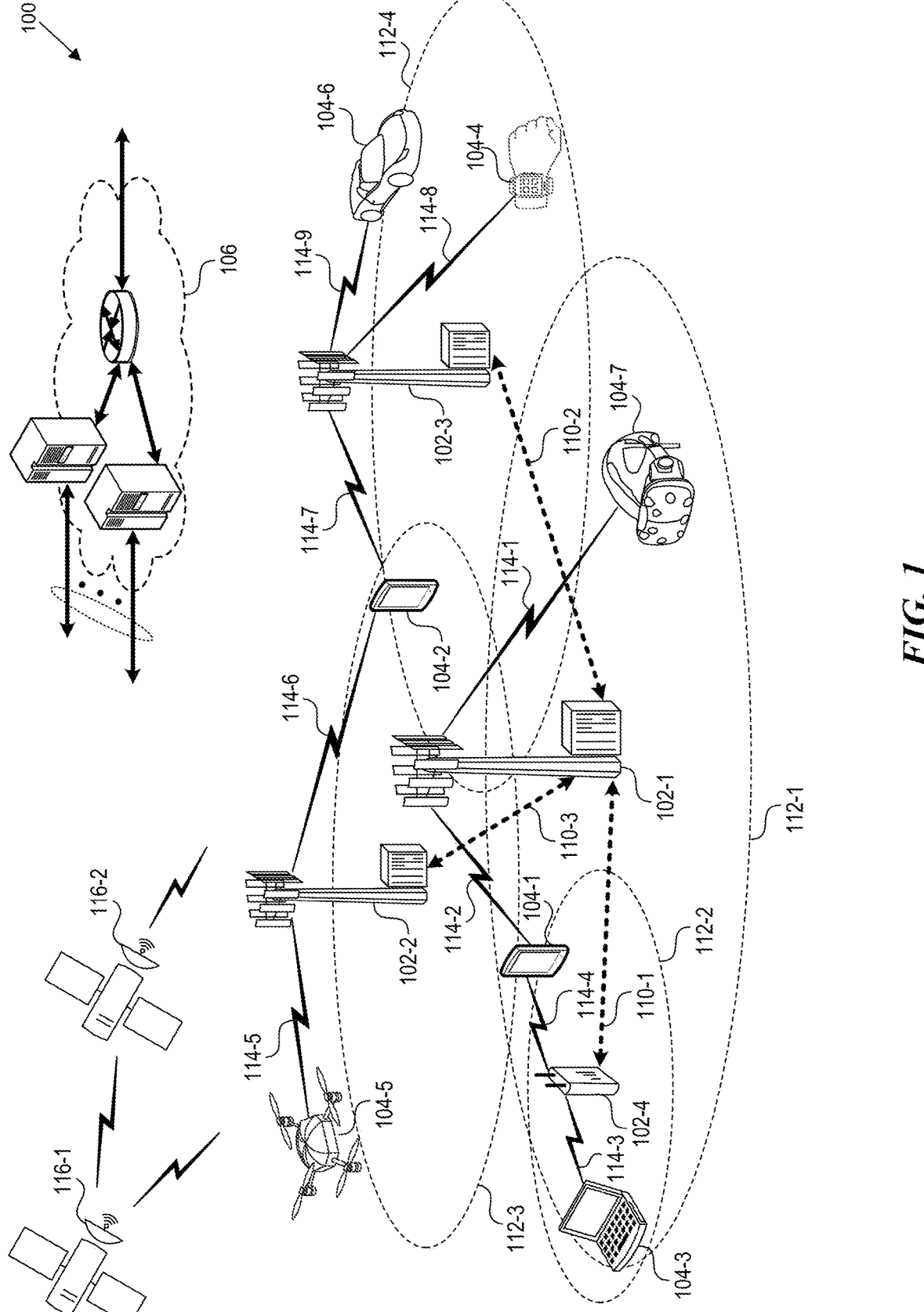
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustra-tion, those skilled in the art will recognize that alternative implementations can be employed without departing from the principles of the present technologies. Accordingly, while specific implementations are shown in the drawings, the technology is amenable to various modifications.

DETAILED DESCRIPTION

Information regarding coverage, capacity, quality of ser-vice, and other indicators of network performance for mobile networks are important to telecommunication net-work providers/operators to help them make decisions for adjustments to a network (e.g., tweaking cell tower configu-rations, adding new equipment, planning for the installation of new cell sites, and the like). Conventionally, drive testing, where a tester drives along a designated route using a motor vehicle equipped with network measurement equipment, is employed to ensure network performance.

However, there are many limitations and problems with drive tests. Drive tests are cost-intensive, technologically ineffective under dynamic circumstances, fail to provide data regarding in-building coverage, limited to data col-lected with only a few types of user equipment, and limited in geographic scope. Because drive testing involves vehicles traversing long hours over extensive areas to gather com-prehensive data, drive tests incur significant usage of fossil fuels. Furthermore, whenever mobile networks are upgraded or a new network feature or infrastructure is implemented, drive tests need to be repeated. Such frequent and intensive usage of fossil fuels in vehicles releases carbon dioxide and causes other greenhouse gases to be emitted into the atmo-sphere, contributing to climate change across the world.

Another limitation is that because drive testing is costly and energy-intensive, they are provided periodically, in infrequent intervals. Because of this, data can quickly become obsolete and uninformative such that problems with networks are not addressed immediately (or in near real-time), such as during dynamic weather events. Such network failure can lead to issues to those who depend critically on dependable/reliable network service, including first responders who require network connectivity to communi-cate and respond promptly to emergencies. Hospitals and health centers also require connectivity to operate patient care devices and systems, as do operators for air traffic control who rely on networks for coordinating directions.

Similarly, drive testing is limited in scope to the equip-ment provided to the tester and limited to network perfor-mance on major roadways. As such, data regarding network performance at various types of user equipment, such as different mobile devices, smart devices, etc. is often disre-garded and impossible to collect. Drive tests often miss data regarding network performance at a smaller scale (e.g., streets, alleys, rural paths) which subsequently leads to missed micro-level network issues.

Accordingly, a mechanism is desired that would enable operators and service providers to obtain up-to-date network performance data at a more granular level (e.g., various user equipment, various locations, more frequently etc.) and without requiring the cost and fuel required through using separate drivers. There are many challenges with doing so, as combinations of different features, different user equipment, and different network providers require different tests amongst testers. As such, a solution is desired that would identify software tests for a specific user equipment and environment, where the software tests can be used to collect information for assessing network features.

Methods and techniques described herein provide for a way of allowing pre-existing users of telecommunications services (e.g., drivers, delivery men, etc.) to execute various tests, rather than relying on separate drivers for drive testing. In this way operators and service providers can obtain metrics that are not available with drive testing and can also prevent greenhouse gas emission. For example, because the system leverages users connected to the network, the system can obtain metrics in buildings, in remote roads, and are enabled to obtain those metrics much more frequently. In this way, operators can provide better service that reflects dynamic needs.

To overcome the limitations described above, the inventors have conceived and reduced to practice systems and methods to enable determination and assessing of network features, e.g., by identifying suitable tests for a user device to perform. The system selectively executes software tests by accessing, from a database, a suite of test profiles corresponding to software tests for assessing a network feature. Each test profile includes (1) at least a portion of a script to be executed on a mobile device, (2) a set of conditions for triggering execution on the mobile device, (3) power consumption availability threshold required for execution, and (4) one or more metrics to be measured during execution. The system may receive from a mobile device, data indicative of power consumption availability of the mobile device and a set of values corresponding to one or more conditions for triggering execution for the software tests. Based on this information, the system can identify a plurality of software tests that the mobile device is capable of executing and transmit, to the mobile device, at least one portion of a script from the test profiles. The system may receive, from the mobile device, via a telecommunications service network, an indication of successful execution of the at least one portion of the script and one or more metrics indicating network performance of the mobile device during the execution.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.
Wireless Communications System FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 provides communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
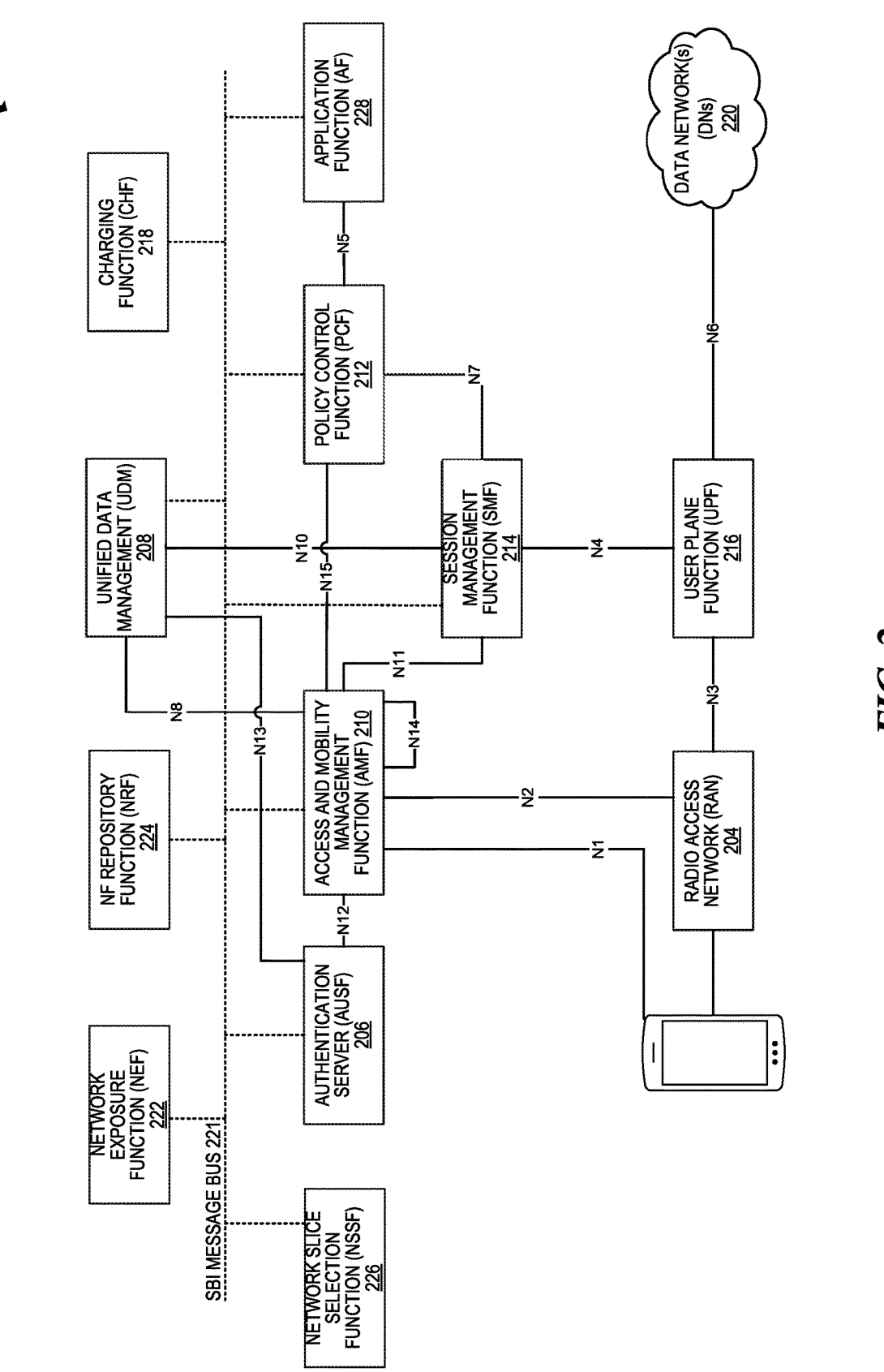
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them.

The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface, and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Suitable Computing Environments

Figure 3:
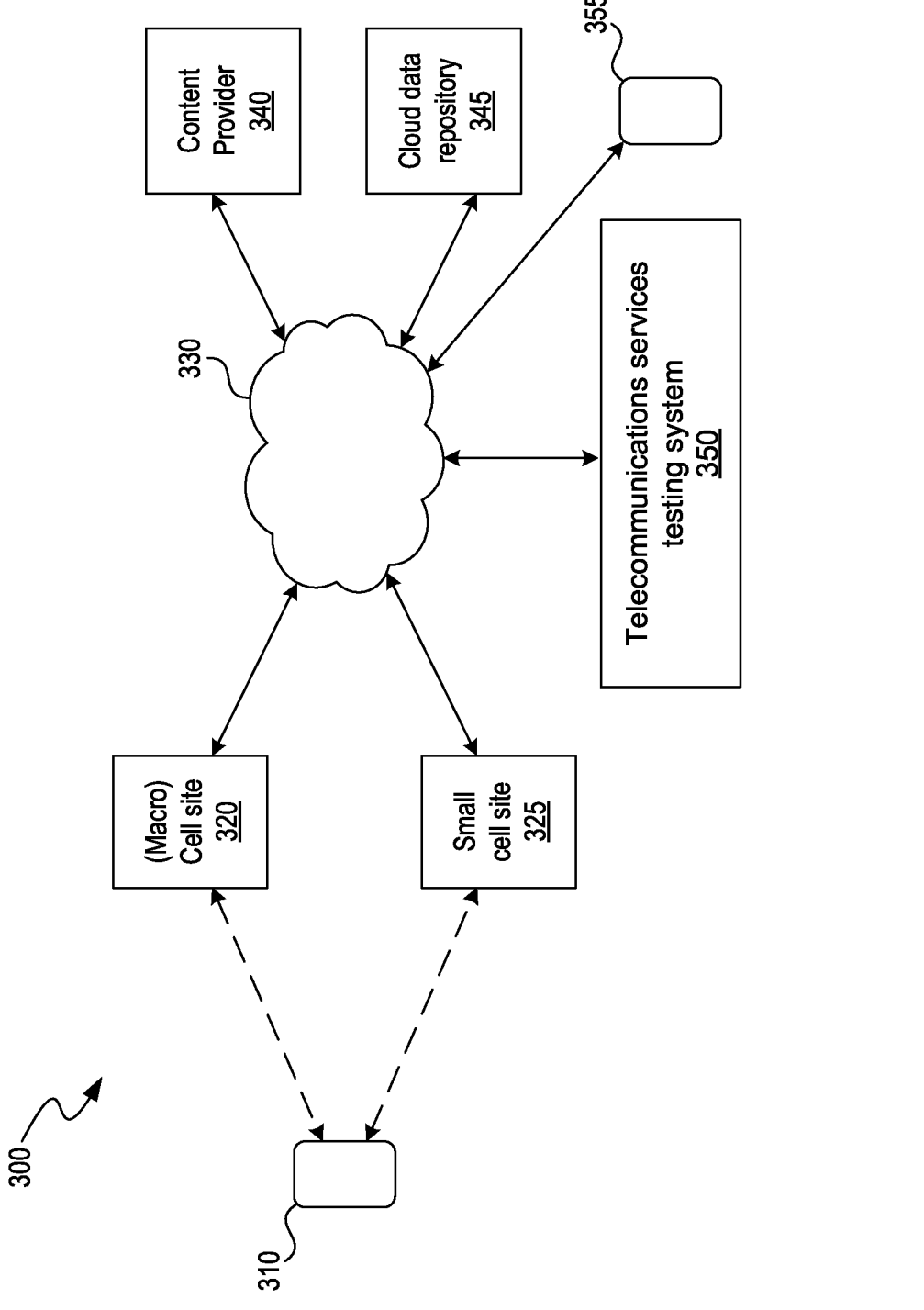
FIG. 3 is a block diagram illustrating a suitable computing environment within which to assessing network features by selectively executing software tests.

FIG. 3 is a block diagram illustrating a suitable computing environment within which to assess network features by selectively executing software tests. As described herein, computing environment 300 of FIG. 3 can be used to identify software tests for selective execution, so that data can be collected for assessing network features. Computing environment 300 can include one or more user device(s) 310, one or more cell-sites 320 and 325, telecommunications network 330, content provider 340, cloud data repository 345, one or more other user devices 355, and telecommunications services testing system 350.

User device(s) 310 may include one or more of wireless devices 104, such as mobile devices or user equipment (UE) associated with users (Internet of Things (IoT) devices, vehicles (e.g., smart vehicles), devices with sensors, and so on, and can be configured to receive and transmit data, stream content, and/or perform other communications or receive services over a telecommunications network 330, which is accessed by the user device 310 over one or more cell sites 320, 325. For example, the mobile device 310 accesses a telecommunication network 330 via a cell site to transmit and receive data (e.g., stream or upload multimedia content) from various entities, such as a content provider 340, cloud data repository 345, and/or other user devices 355 on the network 330.

In some examples, a user utilizes ridesharing or delivery services as a driver. When computing a route for the user, the system can suggest routes/trips/deliveries that will move the user equipment or user device through locations for which testing is needed. For example, ride/route A may pass through a point B which is remote and infrequently tested for network performance. Because certain tests in geographical areas may be sparse in terms of data as they are not well traversed, the system may recommend to the user to select ride A or reward the user more for ride A over a different ride that traverse through points that are heavily traversed and have frequent user devices (e.g., an abundancy with which to have up-to date data on network performance). According to some examples, the user may select (e.g., toggle on or off) whether or not to get suggested routes/trips/deliveries that will move the user equipment/device through locations for which testing is needed (e.g., via a user interface of the user device(s) 310).

The cell sites can include macro cell sites 320 or small cell sites 325. The cell sites 320, 325 can store data associated with their operations, including data associated with the number and types of connected users, data associated with the provision and/or utilization of a spectrum, radio band, frequency channel, and so on, provided by the cell sites 320, 325, and so on. The cell sites 320, 325 can monitor their use, such as the provisioning or utilization of physical resource blocks (PRBs) provided by a cell site physical layer in LTE network; likewise, the cell sites can measure channel quality, such as via channel quality indicator (CQ) values, etc.

As described herein, the telecommunications services testing system 350 may be used to identify tests to execute on a user's device 310 (e.g., mobile device). The tests may be identified based on characteristics of the user device and/or user preferences. Alternatively, or additionally, the tests may be identified based on the network attribute to be tested, service provider parameters (e.g., new areas where service provider is looking to expand, areas of poor network coverage, areas from which more customer complaints are received, etc.). The user device(s) 310 may execute the script of the test, or at least a portion thereof, to obtain values (e.g., raw signal values) and may transmit the values to the service provider. The service provider may calculate one or more metrics based on the received values. Alternatively, or additionally, the user device(s) 310 may execute the script of the test, or at least a portion thereof, and may transmit to the telecommunications services testing system one or more metrics (e.g., calculated on the user device) indicating network performance of the mobile device during the execution of the script.

For example, the telecommunications services testing system 350 accesses, via telecommunications network 330, one or more tests or test profiles of tests which include information regarding tests to be run by various types of user device(s) 310. The software tests may be stored as one or more files on a local hard drive (e.g., solid state drives (SSDs) and/or hard disk drives (HDDs)) and/or on cloud storage platforms (e.g., cloud data repository 345 and/or content provider 340) as part of one or more test profiles. Each test profile may include one or more tests may be stored as individual scripts or grouped together in test suites or modules, e.g., based on the complexity of the software being tested. Test suites may include related test scripts intended to test specific software features or cases, e.g., a collection of individual test cases that are intended to test a specific software behavior or functionality. Each test may have a corresponding test profile which may include a predefined set of test configurations or parameters used during the testing process. In some examples, the telecommunications services testing system 350 may access the tests by requesting tests for a certain software feature or certain hardware status. Alternatively, or additionally, the system may access the tests based on identifiers that identify each script or test suite/module.

The test profile may include information as to whether tests within the test profile are meant to be conducted simultaneously or sequentially, and in what order. For example, e.g., when the user equipment is advanced enough, the equipment may be enabled to run tests in parallel, which may mimic real-world scenarios where different network features may be used in parallel by a user and may affect the other. Alternatively, or additionally, certain tests may be required to run in sequence in order to isolate specific conditions or to avoid interference between tests (e.g., if an operator wishes to test drop rate of voice calls without interference of data traffic, a voice call test may be performed separately from a data throughput test). The operator may identify these testing parameters within the test profile, or they may be embedded in scripts of the tests themselves. According to some implementations, once the tests are performed, the local storage and/or cloud platform may be updated to include a history of tests that have been executed, as well as associated details, such as a user or user device identifier, a user device type, time it took to complete the test, what tests were performed, location, metrics that were measured, etc.

The telecommunications services testing system 350 may receive from the user device(s) 310, e.g., via network 330 and/or cell sites (e.g., macro cell site 320 and small cell site 325, information regarding the user device(s) 310, such as power consumption availability of the user device(s) 310, a type of device of user device(s) 310, available memory of user device(s) 310, network connectivity information (e.g., Quality of Service) and/or other information regarding the user device(s) 310 such as a location, a designated location or route for travel, and/or the like. Based on this information, and information such as user preferences of the user device(s), the telecommunications services testing system 350 may identify one or more tests for the user device to perform (e.g., by executing a script associated with the test), such as from the cloud data repository 345.

The user preferences may be obtained in one or more different ways. For example, the user device(s) 310 provides the user preferences, or values indicative of user preferences. In one example, the user device(s) 310 transmits an identifier identifying the user device(s) 310 and/or a user associated with the user device(s) 310. As referred to herein, an identifier may include a unique alphanumeric string identifying a device used to identify or authenticate devices, e.g., in telecommunications and/or computing contexts. In some examples, the identifier may include an International Mobile Subscriber Identity (IMSI), e.g., a number that uniquely identifies every user of a cellular network. The IMSI may be stored as a 64-bit field and may be sent by the mobile device to the network. Alternatively, or additionally, the identifier may include a Mobile Station International Subscriber Directory Number (MSISDN) which includes a number uniquely identifying a subscription in a Global System for Mobile communications or a Universal Mobile Telecommunications System mobile network. The MSISDN may be a mapping of the telephone number to the subscriber identity module in a mobile or cellular phone. Alternatively, or additionally, identifiers may include Mobile Equipment Identifier (MEID), International Mobile Equipment Identity (IMEI), and/or the like. Using the identifier, the telecommunications services testing system 350 may obtain user preferences, e.g., from a user profile linked to the user device(s) 310 or the user associated with the user device(s) 310.

In some examples, the user preferences include preferences for power consumption availability for executing a script, number of software tests for which scripts can be executed during a time interval, and/or minimum number or amount of resources associated with a software test. For example, the user indicates a preference for battery that can be depleted, or at what battery percentages the user may enable testing to occur. In one example, the user can indicate that the user device is enabled to perform tests that deplete only 4% or less of the battery, or that the user device is enabled to perform tests if the battery level of the user device exceeds an amount, e.g., 50%. The user may also set preferences to allow a minimum number of tests and/or a maximum number of tests. For example, the user enables at least one test a day, but may automatically prevent the system from executing scripts associated with 5 tests. In another example, the user only enables scripts to be executed on the user device if the number or amount of resources (e.g., points, tokens, money) that the user is transmitted as a result of successful completion of the test exceeds a minimum amount.

The telecommunications services testing system may transmit to the user device(s) 310, e.g., via the network 330 and cell sites (e.g., macro cell site 320, small cell site 325), at least one portion of a script from the test profiles. For example, the system sends the test script from the server to the mobile device and/or sending a script identifier to the mobile device. The script identifier may be used to identify a script at a separate server or database. For example, the system accesses a separate server and/or database and retrieves the script corresponding to the script identifier. Alternatively, or additionally, the mobile device (e.g., user device) may include the script or a portion thereof to be executed. The system may transmit the script identifier, which may be used by the mobile device to identify the script and execute the identified script.

The mobile device may execute the portion or whole of the script and measure one or more metrics indicating network performance of the user device(s) 310 during execution. The user device(s) 310 may transmit the network performance metrics. The telecommunications services testing system may receive from the user device(s) 310, an indication of successful execution of the at least one portion of the script and the one or more metrics indicating network performance of the mobile device during the execution. The script or a portion thereof may be executed on the user device(s) 310, or on other devices described herein.

FIG. 3 and the discussion herein provide a brief, general description of a suitable computing environment 300 in which the telecommunications services testing system 350 can be supported and implemented. Although not required, aspects of the telecommunications services testing system 350 are described in the general context of computer-executable instructions, such as routines executed by a computer, e.g., mobile device, a server computer, or personal computer. The system can be practiced with other communications, data processing, or computer system configurations, including Internet appliances, hand-held devices (including tablet computers and/or personal digital assistants (PDAs)), Internet of Things (IoT) devices, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In alternative implementations, the mobile device or portable device can represent the server portion, while the server can represent the client portion.

In some implementations, the user device(s) 310 and/or the cell sites 320, 325 can include network communication components that enable the devices to communicate with remote servers or other portable electronic devices by transmitting and receiving wireless signals using a licensed, semi-licensed, or unlicensed spectrum over communications network, such as telecommunications network 330. In some cases, the telecommunications network 330 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network 330 can also include third-party communications networks such as a Global System for Mobile (GSM) mobile communications network, a code/time division multiple access (CDMA/TDMA) mobile communications network, a $3^{rd}$ or $4^{th}$ generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the user device is configured to operate and switch among multiple frequency bands for receiving and/or transmitting data.

Further details regarding the operation and implementation of the telecommunications services testing system 350 will now be described.

Examples of Identifying Telecommunications Network Performance on Roadways

Figure 4:
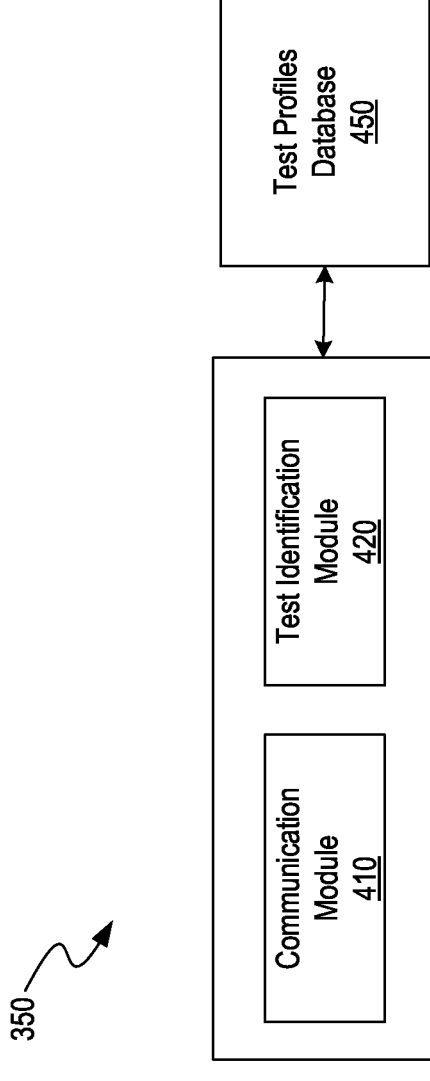
FIG. 4 is a block diagram illustrating the components of an telecommunications services testing system.

FIG. 4 is a block diagram illustrating the components of an exemplary telecommunications services testing system 350. The exemplary telecommunications services testing system 350 can include functional modules that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the specific functions described herein. For example, the telecommunications services testing system 350 includes a communication module 410, a test identification module 420, each of which is discussed separately below.

Communication Module

Communication module 410 of telecommunications services testing system 350 can include software and/or hardware components allowing for the transmission and/or receipt of information between two or more devices. Communication module 410 can include a wireless communication module, such as a cellular radio or Wi-Fi antenna, to allow for communication over wireless networks, and/or can additionally or alternatively include a network card (e.g., a wireless network card and/or a wired network card) that is associated with software to drive the card.

The communication module 410 is configured and/or programmed (e.g., via the above-mentioned techniques) to interface between a user device (e.g., device(s) 310, one or more other user devices 355), cell sites (e.g., cell sites 320, 325), content provider (e.g., content provider 340), cloud data repository (e.g., cloud data repository 345) such as via a network (e.g., network 330), to receive and transmit data. When communication module 410 receives data, the module can pass on relevant portions of data to different modules of the telecommunications services testing system 350. Communication module 410 can be configured and/or programmed to access test profiles from a database, receive information from the user device (e.g., user preferences, an indication of successful execution of the at least one portion of the script, one or more metrics indicating network performance), and transmit at least one portion of a script from the test profiles for the user device(s) 310 to execute.

As described herein, communication module 410 can access, from a database (e.g., such as content provider 340, cloud data repository 345), a suite of test profiles corresponding to software tests for assessing a network feature, e.g., from which one or more tests may be selected for execution on the user device(s) 310. For example, each test profile corresponds to a specific test and can include at least a portion of a script to be executed on a mobile device.

The test profile may also include a set of conditions for triggering execution on the mobile device. For example, certain tests are executed to validate certain features specific to the device's hardware, such as camera functionality, gyroscope, accelerometer, and/or the like. Tests may be executed only when the device is determined to be on, or determined to have the screen on. Similarly, certain tests can be executed based on a location of the user device(s) 310. For example, tests are triggered when the device is in a specific geographic location which may evaluate location-based features or assess network performance in different regions. The test profile may also include a power consumption availability threshold required for execution. For example, the test profile can be power intensive, and so may only be enabled to be executed on user device(s) 310 having at least a threshold level of power available. In some examples, operators and/or engineers at one or more other devices, such as devices 355, may be enabled to access the test profiles via their own devices and make modifications, add tests, and/or the like.

The set of conditions may also include one or more types of devices capable of executing or performing the test. For example, certain tests may only be performed on certain types of devices, such as those including having LTE capabilities only, LTE and 5G capabilities, communication in specific bands, etc. The system may determine the user device(s) 310 type based on an identifier or the like. For example, using the International Mobile Equipment Identity (IMEI) number, International Mobile Subscriber Identity (IMSI) number, the Mobile Equipment Identifier (MEID), Unique Device Identifier (UDID), MAC Address, etc. the system may determine the type of user device(s) 310 and determine whether or not the type of the user device(s) 310 is included in the device types capable of executing the test.

The set of conditions may include whether or not user device(s) 310 is in a specified region, whether a current time is within a specified time during which a script may be executed, and/or a rate of movement of the user device(s) 310. For example, the test is used to measure network performance at a specific location during high traffic. The set of conditions may include whether a current time is within a specified time corresponding to rush hour, or times when historically congestion was high, and trigger the test based on the current time being within the specified time (e.g., time span). Similarly, because the test may be to measure network performance during high traffic (e.g., vehicular or network traffic), the set of conditions may include a rate of movement to determine whether the device is experiencing traffic (e.g., the vehicle that the device is in may have a lower rate of movement when in high volumes of vehicular traffic).

Similarly, the test profile may include one or more metrics to be measured during execution. For example, one or more metrics includes metrics such as network coverage, network strength, e.g., call drop rate, minimum bandwidth available, etc. For example, the metrics include Reference Signal Received Quality (RSRQ), Reference Signal Received Power (RSRP), signal-to-noise ratio (SNR), latency, jitter, Quality of Service (QoS), packet loss, throughput, bandwidth, error rate, availability, round trip time (RTT) and/or the like. The metrics may also include or be calculated or estimated based on network coverage data associated with specific reference points, RF signals, distance between the user device(s) 310 (e.g., mobile device) and at least one telecommunications network site (e.g., cell sites), strength of signal received by the user device(s) 310, quantity of data used by the user device(s) 310, type of user device(s) 310, time taken to receive a message, time taken to send a message, streaming speed, resolution of videos, a mode of transportation, a telecommunications service provider associated with the user device(s) 310, network strength, e.g., call drop rate, minimum bandwidth available, or any combination thereof.

In some examples, the software tests may be used to determine the network speed for each Quality of Service Class Identifier (QCI). For example, the test may include testing to determine whether the actual streaming speed is fast or slow as compared to the expected speed or performance range associated with the QCI value. Similarly, the streaming speed may be measured to determine what streaming speeds correlate to specific QCI values.

Additionally, or alternatively, the test profile may further include resources to be transferred responsive to an indication of successful completion of execution of the script, or a portion thereof. For example, in order to incentivize a user or to reimburse a user for depleting a power consumption availability (e.g., battery power), the test profile can include data indicative of an number or amount of resources, such as tokens, financial instruments, credits, bonus awards, and/or the like that may be transferred to a user or a user's device upon successful completion of execution of the script and test. In some examples, the amount of resources to be transferred is correlated with/based upon the amount of power consumption availability that is required to execute the test. For example, the more power intensive a test is, the more monetary compensation or tokens that can be exchanged for goods and/or services may be transferred. Responsive to the indication of successful execution, the telecommunications services testing system 350 may generate and transmit (e.g., via communication module 410) an instruction configured to cause transmission of the resources corresponding to the test profiles executed by the user device to an account associated with the user device or to the user device itself.

Communication module 410 may receive from the user device(s) 310 (e.g., via network 330, macro cell site 320, small cell site 325), data indicative of power consumption availability of the user device (e.g., such as a battery level) and a set of values corresponding to one or more conditions for triggering execution for the software tests. For example, the user device(s) 310 transmits location data indicating a location of the user device(s) 310, a rate of movement, and/or the like. The communication module 410 can then pass at least a portion of the data obtained to the telecommunications services testing system 350 to identify a plurality of software tests that the mobile device is capable of executing (e.g., from the software tests accessed by the system).

The communication module 410 may receive an indication of the software tests that the user device(s) 310 is capable of executing and may transmit to the user device(s) 310, at least one portion of a script from the test profiles corresponding to the plurality of software tests. In response, the communication module 410 may receive, e.g., from the user device, via a telecommunications service network, an indication of successful execution of the at least one portion of the script and one or more metrics indicating network performance of the mobile device during the execution.

Alternatively, or additionally, the communication module 410 may receive an indication of the software tests that the user device(s) 310 is capable of executing and may transmit, for display on an interface of the user device(s) 310, options for selecting one or more software tests from the identified plurality of software tests and resources corresponding to each. The communication module 410 may receive, from the mobile device, a user selection for one or more software tests. Responsive to the user selection of the one or more software tests, at least one portion of the corresponding tests may be transmitted to the user device and executed. In response, the communication module 410 may receive an indication of successful execution of the at least one portion of the script and one or more metrics indicating network performance of the mobile device during the execution.

According to one implementation, the test is used to determine whether a new version of a network feature is working correctly. The user device may be configured to execute a first version of a network feature and the software tests can include a software test for assessing performance of a second version (e.g., newer version) of the network feature. For example, the communication module 410 retrieves one or more baseline metrics indicating network performance of the mobile device during execution of the first version (e.g., older version) of the network feature. The user device may execute a script or portion thereof that implement the second version of the network feature on the user device. The telecommunications services testing system may determine a difference between the one or more baseline metrics and the one or more metrics indicating network performance of the mobile device during execution of the second version of the network feature.

Responsive to determining that the difference exceeds a threshold, the system may generate a recommendation for an action to improve network performance. The recommendation for the action to improve network performance may include a recommendation for terminating execution of the second version of the network feature and recommending execution of the first version of the network feature. In some cases, responsive to determining that the difference exceeds a threshold, the system may automatically terminate execution of the second version of the network feature and recommence execution of the first version of the network feature, e.g., by generating and/or transmitting a command to terminate execution of the second version. In some examples, rather than a new version, the test may include a test for a new band, and the user device may be configured to execute a first version of the new band.

According to another implementation, the tests may yield metrics that may be processed and used by operators to make further decisions. For example, in regions where network performance is shown to be high and/or higher than other service providers, the system may determine to market high network performance. Similarly, the system, e.g., via communication module 410, may transmit notifications to devices for engineers and/or operators so they can make decisions at their interface. For example, engineers and/or operators use this information to decide whether to add antennas, incorporate carrier aggregation, whether to include small cells, upgrade certain towers with fiber optics, etc. In some examples, the system decides whether many users frequent a location, and may decrease the scale of a cell tower responsive to determining that the amount of network coverage of a region far exceeds the need for it. In this way, the system may decrease unnecessary energy consumption.

Test Identification Module

Test identification module 420 of telecommunications services testing system 350 can identify one or more tests for a user device to execute. For example, telecommunications services testing system 350 accesses, via telecommunications network 330, one or more tests or test profiles of tests which include information regarding tests to be run by various types of user device(s) 310. Telecommunications services testing system 350 may identify a plurality of software tests that the mobile device is capable of executing based on the power consumption availability, the set of values corresponding to one or more set of conditions of one or more associated test profiles, and a plurality of user preferences.

As described herein, because drive testing involves vehicles traversing long hours over extensive areas to gather comprehensive data and because drive tests are repeated whenever mobile networks are upgraded or a new network feature or infrastructure is implemented, a significant amount of fossil fuels are used, ultimately contributing to climate change across the world. By performing these tests using user equipment of willing users connected to the network or associated with the telecommunications service, the usage of a significant amount of fossil fuels can be eliminated.

In one implementation, identifying the plurality of software tests that the mobile device is capable of executing includes calculating, for each software test, a first projected fuel cost for measuring the one or more metrics using the mobile device. The system may calculate, for each software test, a second projected fuel cost for measuring the one or more metrics using an alternate tester device, such as using drive testing or using a different user's device. The system may determine whether the second projected fuel cost exceeds the first projected fuel cost. In response to determining that the second projected fuel cost exceeds the second projected fuel cost, the system may generate a command or instruction to prevent the alternate tester device from measuring the one or more metrics, such as to remove and prevent greenhouse gases in the atmosphere.

In one example, a first and second user may utilize ridesharing or delivery services as a driver. In this case, the system may select only one user to test a particular test based on which of the first and second users will use less fossil fuel or have the least amount of carbon emission. For example, this may be determined based on an estimated distance of travel for a route of the first and second user and/or an estimated time to complete the route. The system may also use details of a vehicle of the user to estimate which is more fuel usage intensive and choose to perform the test using the device of the user having a least fuel intensive vehicle. In some examples, a combination of the above-mentioned parameters (e.g., length or time of route, type of vehicle) may be used to determine a total estimated fossil fuel, carbon emission, greenhouse gas emissions in the atmosphere that would be used or released during testing. The system may then select the device determined to require the least amount of fossil fuel, carbon emission, greenhouse gas emissions used/released for executing the tests.

The system may transmit to the user device(s) 310, e.g., via the network 330 and cell sites (e.g., macro cell site 320, small cell site 325), at least one portion of a script from the test profiles. The user device may execute the portion or whole of the script and measure one or more metrics indicating network performance of the user device(s) 310 during execution. The user device(s) 310 may transmit the network performance metrics. The telecommunications services testing system can receive from the user device(s) 310, an indication of successful execution of the at least one portion of the script and the one or more metrics indicating network performance of the mobile device during the execution.

Figure 5A:
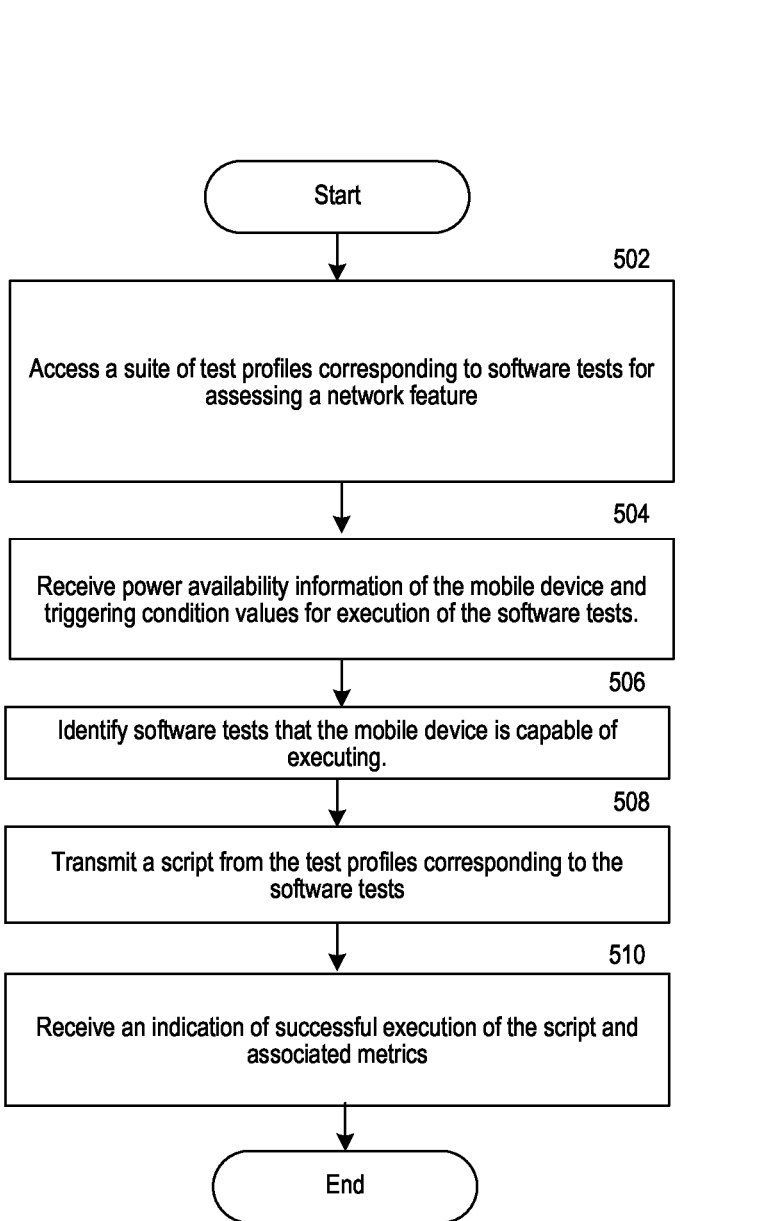
FIG. 5A is a flow diagram illustrating a process of identifying software tests for assessing network features.

FIG. 5A is a flow diagram illustrating a process for identifying software tests for assessing network features. The process may be performed, for example, by telecommunications services testing system 350. Process 500 begins at block 502 where a system (e.g., such as telecommunications services testing system 350) accesses a suite of test profiles corresponding to software tests, e.g., for assessing a network feature. Each test profile may include (1) at least a portion of a script to be executed on a mobile device, (2) a set of conditions for triggering execution on the mobile device, (3) power consumption availability threshold required for execution, and (4) one or more metrics to be measured during execution (as discussed above in reference to the communication module 410 and test profiles database 450).

At block 504, process 500 includes receiving, e.g., from a mobile device, data indicative of power consumption availability of the mobile device and a set of values corresponding to one or more conditions for triggering execution for the software tests (as discussed above in reference to the communication module 410). Process 500 then proceeds to block 506 where a system identifies a plurality of software tests that the mobile device is capable of executing (as discussed in reference to the test identification module 420).

At block 508, process 500 transmits, e.g., to the mobile device, at least one portion of a script from the test profiles corresponding to the identified software tests (as discussed above in reference to test profiles database 450). The process proceeds to block 510, where the system receives, e.g., from the mobile device, an indication of successful execution of the at least one portion of the script and one or more associated metrics, such as metrics indicating network performance of the mobile device during the execution (as discussed above in reference to the communication module 410).

FIG. 5B is a flow diagram illustrating a process of executing software tests and transmitting data to a telecommunications services testing system. The process may be performed, for example, by user device(s) 310. Process 550 begins at block 512 where a mobile device (e.g., user device(s) 310) transmits power availability information (e.g., battery level) and triggering condition values for execution of the software tests (e.g., geographic location of a mobile device that may trigger execution of tests). For example, the information may be transferred to the telecommunications services testing system 350, which may be configured to use that information to identify tests to be executed by the device as described herein.

At block 514, the process includes receiving a script from test profiles corresponding to software tests, e.g., identified by the telecommunications services testing system. At block 516, process 550 includes executing the script. As a result of executing the script, the process 550 includes obtaining one or more metrics at block 518, e.g., which can be used by operators to determine whether an upgraded system or implemented network feature is working as expected. At block 520, an indication of successful execution of the script and the associated metrics (e.g., the metrics obtained at block 518) are transmitted (e.g., from the mobile device to the telecommunications services testing system).

Computer System

Figure 6:
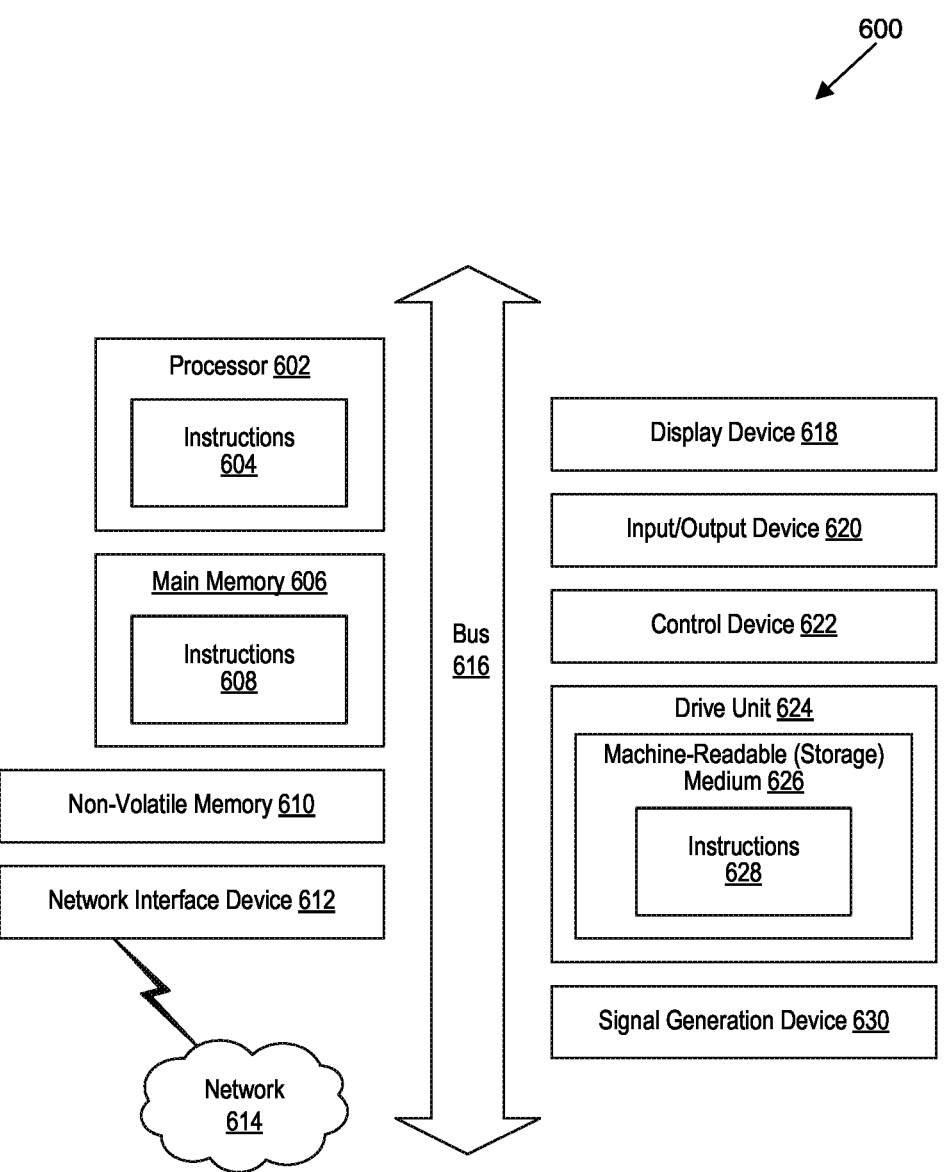
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 shares a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method for assessing network features by selectively executing software tests to enhance a customer's experience with a telecommunications service network, the method comprising:

accessing, from a database, a suite of test profiles corresponding to software tests for assessing a network feature, wherein each test profile comprises (1) at least a portion of a script to be executed on a mobile device, (2) a set of conditions for triggering execution on the mobile device, (3) power consumption availability threshold required for execution, and (4) one or more metrics to be measured during execution;

receiving, from the mobile device, data indicative of power consumption availability of the mobile device and a set of values corresponding to one or more conditions for triggering execution for the software tests;

identifying a plurality of software tests that the mobile device is capable of executing based on the power consumption availability, the set of values corresponding to one or more set of conditions of one or more associated test profiles, and a plurality of user preferences;

transmitting, to the mobile device, at least one portion of a script from the test profiles corresponding to the plurality of software tests; and receiving, from the mobile device, via a telecommunications service network, an indication of successful execution of the at least one portion of the script and one or more metrics indicating network performance of the mobile device during the execution.

2. The method of claim 1, wherein each test profile further comprises resources to be transferred responsive to an indication of successful completion of execution and wherein the method further comprises:

responsive to the indication of successful execution, generating an instruction configured to cause transmission of the resources corresponding to the test profiles executed by the mobile device to an account associated with the mobile device.

3. The method of claim 2, wherein the method further comprises:

transmitting, for display on an interface of the mobile device, options for selecting one or more software tests from the identified plurality of software tests and resources corresponding to each; and receiving, from the mobile device, a user selection for one or more software tests.

4. The method of claim 1, wherein identifying the plurality of software tests that the mobile device is capable of executing further comprises:

calculating, for each software test, a first projected fuel cost for measuring the one or more metrics using the mobile device;

calculating, for each software test, a second projected fuel cost for measuring the one or more metrics using an alternate tester device; and determining, whether the second projected fuel cost exceeds the first projected fuel cost.

5. The method of claim 1, wherein the set of conditions may include whether or not the mobile device is in a specified region, whether a current time is within a specified time during which a script may be executed, and a rate of movement of the mobile device.

6. The method of claim 2, wherein the plurality of user preferences comprises preferences for power consumption availability for executing a script, number of software tests for which scripts can be executed during a time interval, and minimum amount of resources associated with a software test.

7. The method of claim 1, wherein the mobile device is configured to execute a first version of a network feature and the software tests comprise a software test for assessing performance of a second version of the network feature, and wherein the method further comprises:

retrieving one or more baseline metrics indicating network performance of the mobile device during execution of the first version of the network feature;

determining a difference between the one or more baseline metrics and the one or more metrics indicating network performance of the mobile device during execution of the second version of the network feature; and responsive to determining that the difference exceeds a threshold, generating a recommendation for an action to improve network performance.

8. The method of claim 7, wherein the recommendation for the action to improve network performance comprises a recommendation for terminating execution of the second version of the network feature and recommending execution of the first version of the network feature.

9. The method of claim 7, further comprising:

responsive to determining that the difference exceeds a threshold, automatically terminating execution of the second version of the network feature and recommencing execution of the first version of the network feature.

10. One or more non-transitory computer-readable media containing instructions which when executed by a processor, perform a method for assessing network features by selectively executing software tests, the method comprising:

accessing, from a database, a suite of test profiles corresponding to software tests for assessing a network feature, wherein each test profile comprises (1) at least a portion of a script to be executed on a mobile device, (2) a set of conditions for triggering execution on the mobile device, (3) power consumption availability threshold required for execution, and (4) one or more metrics to be measured during execution;

receiving, from the mobile device, data indicative of power consumption availability of the mobile device and a set of values corresponding to one or more conditions for triggering execution for the software tests;

identifying a plurality of software tests that the mobile device is capable of executing based on the power consumption availability, the set of values corresponding to one or more set of conditions of one or more associated test profiles, and a plurality of user preferences;

transmitting, to the mobile device, a set of test script indicators corresponding to one or more of the plurality of software tests; and receiving, from the mobile device via a telecommunications service network, one or more metrics indicating network performance of the mobile device during execution of at least one of the one or more of the plurality of software tests at the mobile device.

11. The one or more non-transitory computer-readable media of claim 10, wherein the method further comprises:

transmitting, for display on an interface of the mobile device, options for selecting one or more software tests from the plurality of software tests; and receiving, from the mobile device, a user selection for one or more software tests.

12. The one or more non-transitory computer-readable media of claim 10, wherein receiving the one or more metrics indicating network coverage strength comprises receiving a set of records associated with the mobile device, wherein the set of records includes: latency, signal speed, and/or jitter.

13. The one or more non-transitory computer-readable media of claim 10, wherein the set of conditions may include whether or not the mobile device is in a specified region, whether a current time is within a specified time during which a script may be executed, and a rate of movement of the mobile device.

14. The one or more non-transitory computer-readable media of claim 10, wherein the plurality of user preferences comprises preferences for power consumption availability for executing a script, number of software tests for which scripts can be executed during a time interval, and minimum amount of resources associated with a software test.

15. The one or more non-transitory computer-readable media of claim 10, wherein the mobile device is configured to execute a first version of a network feature and the software tests comprise a software test for assessing performance of a second version of the network feature, and wherein the method further comprises:

retrieving one or more baseline metrics indicating network performance of the mobile device during execution of the first version of the network feature;

determining a difference between the one or more baseline metrics and the one or more metrics indicating network performance of the mobile device during execution of the second version of the network feature; and responsive to determining that the difference exceeds a threshold, generating a recommendation for an action to improve network performance.

16. A system for assessing network features by selectively executing software tests to enhance a customer's experience with a telecommunications service network, the system comprising:

one or more processors; and one or more non-transitory computer-readable media storing instructions that, when executed by the one or more processors, cause operations comprising:

accessing, from a database, a suite of test profiles corresponding to software tests for assessing a network feature, wherein each test profile comprises (1) at least a portion of a script to be executed on a mobile device, (2) a set of conditions for triggering execution on the mobile device, (3) power consumption availability threshold required for execution, and (4) one or more metrics to be measured during execution;

receiving, from the mobile device, data indicative of power consumption availability of the mobile device and a set of values corresponding to one or more conditions for triggering execution for the software tests;

identifying a plurality of software tests that the mobile device is capable of executing based on the power consumption availability, the set of values corresponding to one or more set of conditions of one or more associated test profiles, and a plurality of user preferences;

transmitting, to the mobile device, a set of test script indicators corresponding to one or more of the plurality of software tests; and receiving, from the mobile device via a telecommunications service network, one or more metrics indicating network performance of the mobile device during execution of at least one of the one or more of the plurality of software tests at the mobile device.

17. The system of claim 16, wherein the one or more non-transitory computer-readable media further cause operations comprising:

transmitting, for display on an interface of the mobile device, options for selecting one or more software tests from the plurality of software tests; and receiving, from the mobile device, a user selection for one or more software tests.

18. The system of claim 16, wherein receiving the one or more metrics indicating network coverage strength comprises receiving a set of records associated with the mobile device, wherein the set of records includes: latency, signal speed, and/or jitter.

19. The system of claim 16, wherein the set of conditions may include whether or not the mobile device is in a specified region, whether a current time is within a specified time during which a script may be executed, and a rate of movement of the mobile device.

20. The system of claim 16, wherein the plurality of user preferences are determined based on user input via the mobile device and/or are obtained from a user profile associated with the mobile device stored at the database.

* * * * *